United States Patent [19]

Katz

[11] Patent Number: 5,297,197

[45] Date of Patent: * Mar. 22, 1994

[54] MULTIPLE PARTY TELEPHONE CONTROL SYSTEM

[75] Inventor: Ronald A. Katz, Los Angeles, Calif.

[73] Assignee: First Data Resources Inc., Omaha, Nebr.

[*] Notice: The portion of the term of this patent subsequent to Jul. 3, 2007 has been disclaimed.

[21] Appl. No.: 895,077

[22] Filed: Jun. 8, 1992

Related U.S. Application Data

[63] Continuation of Ser. No. 832,720, Feb. 7, 1992, Pat. No. 5,185,787, which is a continuation of Ser. No. 642,602, Jan. 17, 1991, Pat. No. 5,091,933, which is a continuation of Ser. No. 470,468, Jan. 26, 1990, Pat. No. 4,987,590, which is a continuation of Ser. No. 371,188, Jun. 26, 1989, Pat. No. 4,939,773.

[51] Int. Cl.$^5$ .................. H04M 3/56; H04M 11/06; H04M 1/26
[52] U.S. Cl. ................... 379/204; 379/205
[58] Field of Search ............. 379/204, 205, 92, 156, 379/158, 165, 355

[56] References Cited

U.S. PATENT DOCUMENTS

| | | |
|---|---|---|
| 4,355,207 | 10/1982 | Curbin . |
| 4,376,875 | 3/1983 | Beirne . |
| 4,451,700 | 5/1984 | Kempner et al. . |
| 4,468,528 | 8/1984 | Reece et al. . |
| 4,489,438 | 12/1984 | Hughes ............... 381/51 |
| 4,635,251 | 1/1987 | Stanley et al. ........ 379/204 |
| 4,845,739 | 7/1989 | Katz ................. 379/93 X |
| 4,939,773 | 7/1990 | Katz ................ 379/205 X |

FOREIGN PATENT DOCUMENTS 0152365 11/1981 Japan ..................... 379/92

*Primary Examiner*—Stephen Chin
*Assistant Examiner*—Paul Loomis

[57] ABSTRACT

To interface a primary telephone terminal with a vast number of remote terminals through a telephone network, parties at the remote terminals are individually screened to attain a select group. Bridged together, the select group is preliminarily informed of the status of the interface by a voice generator and, accordingly, the multitude of connections are synchronized for the interface. On cue, the select group is coupled to the primary telephone terminal for unilateral communications. Deviations from the unilateral communication include select bilateral communication for a few of the remote terminals and digital communication from the remote terminals by push button as for polling applications. Subjects for interfaces are programmed for selection from a memory.

18 Claims, 4 Drawing Sheets

MULTIPLE PARTY TELEPHONE CONTROL SYSTEM

This is a continuation of application Ser. No. 07/832,720, filed Feb. 7, 1992, entitled "MULTIPLE PARTY TELEPHONE CONTROL SYSTEM WITH RANDOM DIALING FOR POLLING", now U.S. Pat. No. 5,185,787, which is a continuation of application Ser. No. 07/642,602, filed Jan. 17, 1991, entitled "MULTIPLE PARTY TELEPHONE CONTROL SYSTEM", now U.S. Pat. No. 5,091,933, which is a continuation of application Ser. No. 470,468, filed on Jan. 26, 1990, entitled "MULTIPLE PARTY TELEPHONE CONTROL SYSTEM", now U.S. Pat. No. 4,987,590, which is a continuation of application Ser. No. 07/371,188, filed Jun. 26, 1989, entitled "MULTIPLE PARTY TELEPHONE CONTROL SYSTEM", now U.S. Pat. No. 4,939,773.

BACKGROUND AND SUMMARY OF THE INVENTION

For a number of years, telephonic communication primarily involved singular conversations between individual persons. However in recent years, the applications and uses for telephonic communication have radically expanded. Currently, telephone facilities are widely used to communicate digital information in conjunction with various forms of computer apparatus. In a related context, fully automated central station equipment has been developed for effectively communicating with persons calling to: receive information, provide statistical data or even consummate various transactions.

Another area of expanded telephonic communication involves techniques for variously interfacing persons. For example, in contemporary telephone systems, a variety of conference call techniques and caller selection operations can be executed at an individual telephone terminal. Also, push buttons on telephone keyboards have been utilized to implement secondary connections as desired by a caller. However, in spite of various prior telephonic developments, a need has been recognized for further expansion in multiple party telephonic communication and particularly with regard to systems affording flexibility and control, and with the capability to interface a large number of remote terminals, e.g. thousands, as for example to receive information. Thus, the present invention enables vastly expanded telephonic communication, as to inform, entertain or poll a multitude of people, as per pending application Ser. No 194,258.

In general, the present invention may be embodied to implement and control interfaces through a telephone network between a primary terminal and a large number of remote terminals. Typically, the interfaces will involve unidirectional communication flowing from the primary terminal to a multitude of remote terminals. However, limited bilateral communication may be provided for a few of the remote terminals. To consider an exemplary operation, a personage at the primary terminal might report "live" to a large, select group of individuals at remote terminals. Select bilateral conversations also could be communicated to the listening group. Furthermore, digital data may be collected from the remote terminals as in polling applications. The data would be formulated at the remote terminals by the telephone push buttons.

In accordance with the present invention, a selection structure screens individual terminals during a preliminary engagement phase of establishing communication with the multitude of people. During the engagement period, persons at individual terminals can be greeted, then qualified on the basis of digital communication provided from the individual terminals via the telephone touch keyboard.

As the engagement period proceeds, a growing group of qualified terminals are bridged for gang communication to receive call status information collectively. The group is thus synchronized preparatory to the live communication when the switching apparatus unilaterally couples the qualified group of terminals to the primary telephone terminal. Variations may then accommodate some bilateral communication, for example to enable limited conversations or polling.

BRIEF DESCRIPTION OF THE DRAWINGS

In the drawings, which constitute a part of this specification, an exemplary embodiment of the invention is set forth as follows.

DESCRIPTION OF THE ILLUSTRATIVE EMBODIMENT

As indicated above, a detailed illustrative embodiment of the present invention is disclosed herein. However, elements in accordance with the present invention may be embodied in a wide variety of forms some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
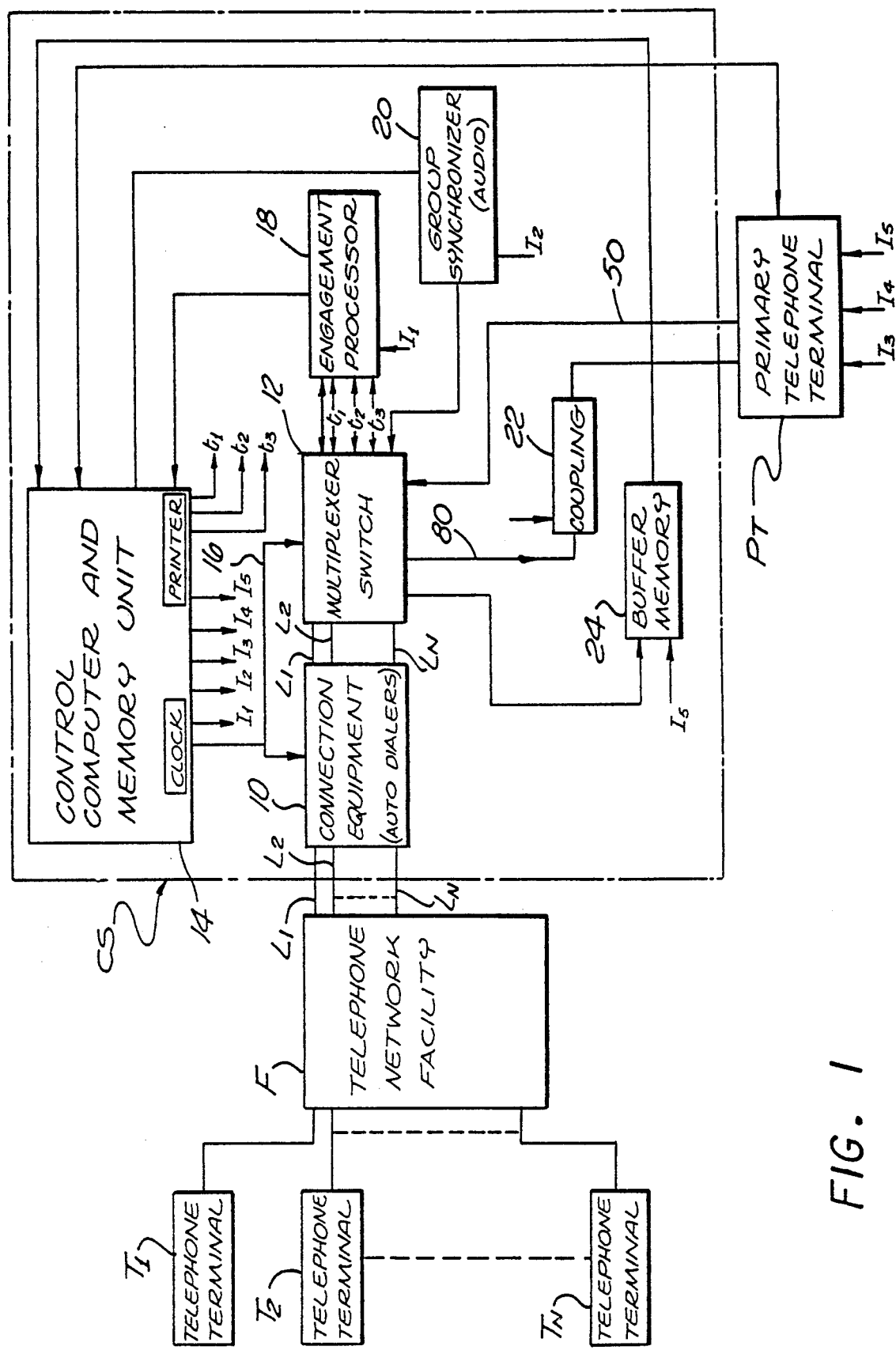
FIG. 1 is a block diagram of a system constructed in accordance with the present invention.

Referring initially to FIG. 1, a multitude of telephone terminals T1 through TN are represented at the left of the figure connected to a telephone network facility F. Essentially, the telephone network facility F comprises a comprehensive public telephone network or system through which any of the multitude of telephone terminals T1 through TN may be employed to call another terminal and establish telephonic communication. The telephone terminals T1 through TN may constitute a wide variety of instruments, typically including a handpiece (microphone and earphone) and a keyboard or punch pad (not shown).

In accordance with the present invention, a select group of the telephonic terminals T1 through TN are gang connected through the telephone network facility F and a control system CS to accommodate communication with a primary telephone terminal PT (lower right). To accommodate various operations, the terminal PT may comprise a display terminal incorporating a control panel or keyboard, a CRT display and a telephone headset (microphone and earphones). Accordingly, the primary telephone terminal PT can be used to communicate live with a large, but qualified group of persons at select of the terminals T1-TN.

To consider an exemplary operation of the system, a personage (as the president of a major concern) might give a live status report to a multitude of key people distributed over a large area. The operation might involve confirmed identification of the key people for qualification to participate followed by synchronization for the interconnect. Accordingly, the communication to the key personnel is simultaneous and live. During the communication, the personage at the primary terminal PT may interface bilaterally with a small number of the key people, as by talking to them so as to enhance the report. Furthermore, statistical polling data from the group can be received effectively, monitored and recorded at the control system CS in a digital format.

Considering the control system CS in somewhat greater detail, a large number of telephone lines L1 through LN are provided from the telephone network facility F through connection equipment 10 to a multiplexer switch 12. The equipment 10 may incorporate automatic dialers and audio response units (ARU's) as well known in telephone technology. The switch 12 also incorporates known telephonic technology to accommodate a multitude of lines L1-LN that may be variously connected for individual or group communication. Note that several available units might be ganged together in the equipment 10 and the switch 12 to accomplish the desired capability.

The multiplexer switch 12 and the equipment 10 (along with all elements at the central station CS) are controlled by a computer and memory unit 14 (top, left) through a cable 16. To preserve the drawing legible, only illustrative connections are shown.

Generally, the control unit 14 may comprise a minicomputer of varying capacity depending on the number of lines L1 through LN and the degree of flexibility desired for the interfaces. As illustrated, the unit 14 includes clocking capability and a printer. As a related consideration, it is noteworthy that in operating embodiments, the control unit 14 may incorporate certain of the structures that are shown separately in FIG. 1.

The unit 14 controls the entire system CS and in that regard provides a series of binary command signals I1, I2, I3, I4 and I5, along with subcommand signals t1, t2 and t3. The signals I1 and I2 are concurrent. Otherwise, the command signal I3 alone is high or it is high with one or both of the command signals I4 and I5. Accordingly, select intervals of the operation are defined. Generally, the command signals I1 and I2 concurrently define the engagement interval during which subjects are greeted, qualified and bridged into a select group to receive periodic status reports. During the command signals I1 and I2, the subcommand signals t1, t2 and t3 define specific stages for individual telephone connections.

The interval of live communication is defined by the command signal I3 with communication variations defined by command signals I4 and I5.

Under control of the command signal I1, an engagement processor 18 provides audio signals through the multiplexer switch 12, the equipment 10 and the telephone network facility F to individual telephone terminals T1 through TN. That is, the processor 18 incorporates audio response apparatus to provide voice signals to cue and inform. Accordingly, at a specific terminal, the voice or audio signals may instruct, advise or cue a person with regard to a pending group connection. During such operation (command signal I1) a person at the terminal may be tested for authorized participation in a select group.

The multiplexer switch 12 also is connected to a group synchronizer 20 which is controlled by the command signal I2. The synchronizer 20 also incorporates a voice synthesizer or audio capability to collectively advise persons at select of the terminals T1 through TN of the pending "live" communication. Specifically, the synchronizer 20 may incorporate an audio unit, as well known, to provide digitized audio signals through the switch 12, the equipment 10 and the telephone facility F to all qualified callers bridged at "on-line" terminals prompting a voice message, e.g. "Please continue to stand by. President Jones will be speaking to you live in approximately twenty seconds." Note that at the starting instant of such a message, the select group may be growing as additional persons are qualified at terminals T1-TN. The command signal I1 controls the inclusion of such late persons.

At a predetermined time, communication is complete between the select group at certain of the total telephone terminals T1-TN in the network and a person at the primary telephone terminal PT. In that regard, different specific operations then may occur as defined by the intervals of command signals I3, I4 and I5.

During the interval of signal I3, the primary telephone terminal PT is in unilateral voice communication with the select group of the terminals T1-TN. During the interval of the command signal I4, one or more select individual telephone terminals is provided with bilateral voice communication to the primary terminal PT. The remaining terminals continue in a unilateral or "listen only" mode. Essentially, during the command signal I4, the multiplexer switch 12 couples the few select lines of the lines L1-LN through the coupling 22 for bilateral communication with the terminal PT.

During the interval of command signal I5, digital data is received from the select group of terminals T1 through TN through the lines L1-LN, the equipment 10 and the switch 12 to a buffer memory 24. Data is then transferred from the buffer memory 24 to the control unit 14 for storage. Data also may be supplied from the unit 14 for display at the terminal PT. Specifically, digital signals are provided from select of the telephone terminals T1-TN by actuating the push buttons as well known in the prior art. Typically, in response to a query, digital data is provided from the active terminals T1-TN. For example, the group might be queried: "After much discussion regarding a shorter work week, we are considering the alternatives of a four-day week or a seven-hour day. If you favor a four-day week, please press '1'. If you favor a seven-hour day, please press '2'." Of course, voice code techniques are an alternative.

Recapitulating to some extent, the system of FIG. 1 generally has four phases. The two initial concurrent operations (designated by command signals I1 and I2) specify the first or engagement phase and involve: (1) interfacing through individual lines L1-LN with persons at specific terminals T1-TN to screen or qualify persons for connection with a select group, and (2) maintaining the select group in synchronization as by status reports of the pending communication. To consider an instant during these concurrent operations of the first phase, certain lines, as lines L1 through L475, might be in the operation of command signal I2 while other lines, as lines L476 through L1500, are still in the control of command signal I1.

After the initial phase (signals I1 and I2) the system interfaces the select group with the terminal PT. The various operations and associated structures are indicated in chart form below.

| Designating Command Signal | Operating Phases Operation | Key Structure |
| --- | --- | --- |
| I1 | individually screen calls on lines L1-LN for connection to a select group for collective live participation | engagement processor 18 |
| I2 (concurrent with I1) | hold calls of select group pending live communication | group synchronizer 20 |
| I3 | couple the select group to the primary telephone terminal PT for unilateral live communication | primary telephone terminal PT |
| I4 (concurrent with I3) | I3 operation, plus couple certain terminals for live bilateral communication | coupling 22 |
| I5 (concurrent with I3) | I3 and/or I4 operation, plus receive digital data from terminal group | buffer 24 |

The operations of specific phases may be variously programmed through the control computer and memory unit 14. Operation may involve "inbound" or "outbound" calling with use of various identifications, formats and controls.

Figure 2:
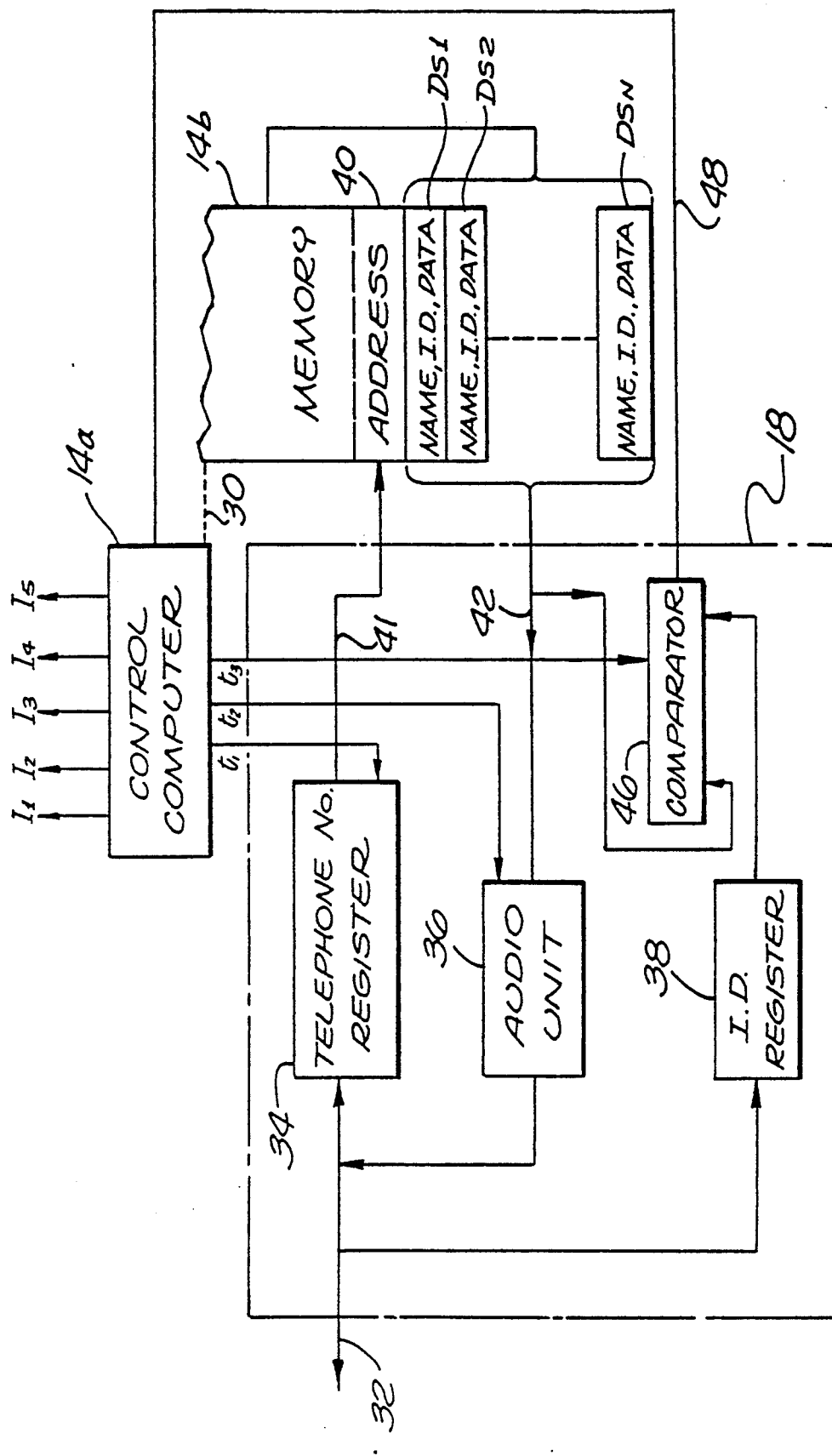
FIG. 2 is a block diagram of a component portion of the system of FIG. 1.

To consider the illustrative operation of the system as controlled by the command signal I1 in somewhat greater detail, reference will now be made to FIG. 2 showing detailed structure of the engagement processor 18 for a single call in combination with the control unit 14. In that regard, a single call format is illustrated for purposes of explanation. However, a multiplexed parallel system would be implemented in an operating embodiment. Also, for ease of illustration in FIG. 2, the unit 14 is shown divided, specifically as a computer 14a and a memory 14b. The integral relationship between the two structures as the unit 14 is indicated by a dashed line 30.

In the disclosed embodiment, the control computer 14a provides the command signals I1-I5 and the sub-command signals t1, t2 and t3 which subdivide the command signal I1 for three distinct operations. Those operations vary with "inbound" and "outbound" modes of operation. In both modes, the individual subject's terminal (telephone) number is set in a register 34 (FIG. 2, upper left). Similarly, the subject's name is set in an audio unit 36 to greet and cue the subject as an individual. In the same manner, the subject's identification number is set in a comparator 46 to be tested with a received identification number from a register 38. The memory section 14a (FIG. 2) incorporates a multiplicity of cells DS1-DSN from which data is supplied on individual callers.

Note that for outbound calls, the subject's number is worked from the register 34. For inbound calls, the subject's number is received from the facility F, as through ANI (automatic number identification equipment). From the register 34, during inbound operation the number is used to address a select one of the cells DS1-DSN. In the event ANI technology is not available, the caller may be asked to punch in his number to provide the digital information in the register 34.

Figure 3:
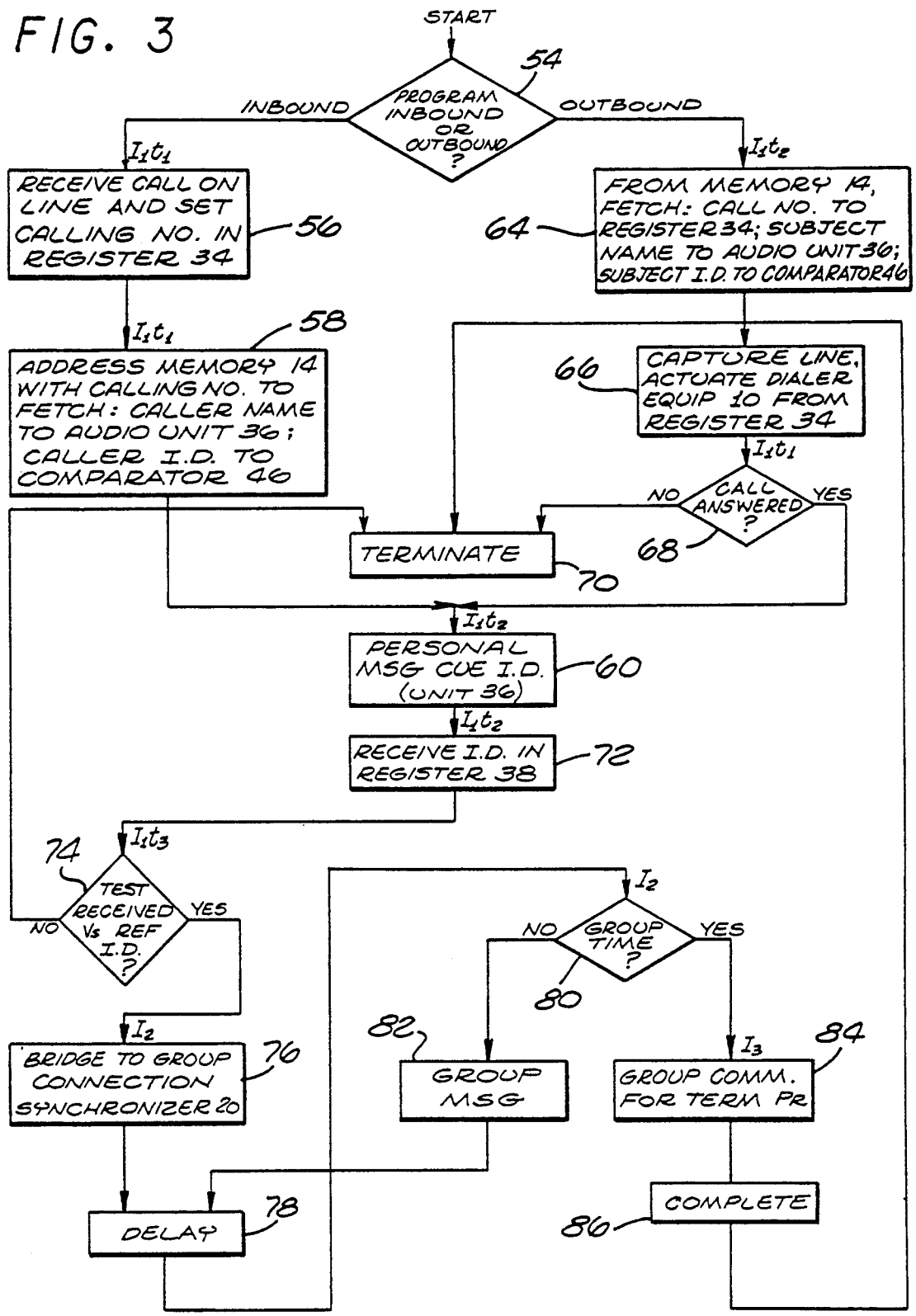
FIG. 3 is a flow diagram of the process executed in the system of FIG. 1.

In view of the above description with reference to FIGS. 1 and 2, a comprehensive understanding of the system may now best be perfected by assuming exemplary patterns of operation and explaining the process with reference to FIG. 3 while relating to the structures of FIGS. 1 and 2.

At the outset, the system is programmed either for "inbound" or "outbound" operation as indicated by a query block 54 at the top of FIG. 3. Initially, assume an inbound operating format involving a personage (corporate principal, government figure, celebrity, pollster or public figure) located at the primary telephone terminal PT (FIG. 1). Additionally, assume the personage is to speak live, by prearrangement with a multitude of people who will come on-line over a period of several minutes and therefore will require synchronization. That is, many persons may be required to wait and accordingly after qualification they are to be bridged into a group for unilateral communication and periodic vocal notices. In that regard, the multiplexer switch 12 (FIG. 1) has the capability to accommodate a large number of lines L1-LN simultaneously. Also, the other elements in the control system CS have similar capability. However, multiplexing, time sharing, pipelining and various other techniques may be employed in systems hereof, utilizing well known techniques of the prior art.

Proceeding with the proposed operation, next assume that each of the persons entitled to join the select group is identified by name and an I.D. number carried in a data cell (DS1-DSN) of the memory 14b (FIG. 2). Note that the I.D. or personal identification numbers are known to calling individuals.

Pursuing the inbound operation, with the placement of a call from one of the telephone terminals T1-TN (FIG. 1), the telephone network facility F is actuated and one of the lines L1-LN carries the call to the multiplexer switch 12. Assuming the existence of automatic number identification technology (ANI), digital signals are received through the connection equipment 10 and the multiplexer switch 12 (FIG. 1) into a calling number register 34 (FIG. 2) as indicated by a block 56 in FIG. 3. These operations occur during the command signal I1.

From the register 34 (FIG. 2) during the interval of the timing signal t1, the memory 14b is addressed to fetch the content of a specific data cell (of the cells DS1 through DSN) into the audio unit 36 and the comparator 46. This operation is illustrated by a block 58 in FIG. 3.

With the identification fetched, the audio unit 36 (FIG. 2) is actuated to greet and cue the caller by name as indicated in FIG. 3 by a block 60. The operation occurs during the timing signal t2. Accordingly, formulated signals are formed to provide audio for a cue message that might be stated: "Welcome Mr. John Doe; thank you for calling. Please punch in your personal identification number."

Greetings of a different format would be used in the outgoing mode of operation. For outgoing calls, the message might be: "If you are Mr. John Doe, please press '1' on the telephone. If not, please call Mr. John Doe to the telephone and ask him to press '1' when he is on the line." These specific controls are implemented by the control unit 14.

Once the desired subject is on the line and is cued for I.D., the system proceeds from the block 60 of FIG. 3 in a similar manner for both inbound and outbound calls. For ease of explanation, prior to considering the process from this point, the outbound operation will be treated reverting to the step of block 54 at the top of FIG. 3.

In the outbound mode, the process flows from block 54 to the step of a block 64 (FIG. 3, right) involving the placement of a call. Accordingly, for the select group of terminals (T1-TN) to be called from the central station CS, telephone numbers are down-loaded or fetched from the cells DS1-DSN (FIG. 2, memory unit 14b) to the connection equipment 10 (FIG. 1). As indicated by a block 66 in FIG. 3, auto-dialers in the equipment 10 then individually capture the lines L1-LN and produce dialing signals to actuate the telephone network facility F.

Calls initiated by the autodialers (connection equipment 10, FIG. 1) may or may not be answered as recognized by the query block 68 (FIG. 3). If a call is not answered, it is terminated as indicated by a block 70. Various termination messages may be implemented depending on specific applications.

If the outbound call is answered, a greeting and cue is provided as explained above to obtain the desired person on the line and cue that person for the assigned personal identification number. That process for the call is controlled by subcommand signal t2 and involves the audio unit 36 (FIG. 2).

In response to a cue, the actuation of alphanumeric buttons at the calling telephone terminal produces digital signals representing the subject's I.D. The representative signals are supplied through the multiplexer switch 12 (FIG. 1) to the I.D. register 38 as indicated by the block 72 (FIG. 3). The process then proceeds to a step illustrated by a query block 74 involving the subcommand signal t3. Specifically, the separate reference and received identification signals are compared by the comparator 46. In that regard, the received signals are supplied from the register 38 (FIG. 2) to the comparator 46, the reference signals having been supplied from the memory 14b.

In certain applications, as those involving polling, it may be desirable to invoke test criteria on the basis of demographics. That is, the person at the remote terminal might be qualified or screened to participate based on demographic considerations. Accordingly, vocal cues would prompt signals from the remote person for comparison with the desired criteria.

Returning to the specific example, if the received signals do not compare favorably with the reference signals, the call is terminated, again as indicated by the block 70. In that event, the process reverts to the interval of timing signal t2 and a termination message is provided by the audio unit 36 (FIG. 2).

If, as the alternative from block 74 (FIG. 3) a favorable comparison terminates the operation indicated by interval signal I1 bridging the caller to the group connected as indicated by the block 76 for operation under control of the command signal I2.

The persons bridged into the qualified group are periodically welcomed and notified regarding the status of the pending live communication. Accordingly, all telephone terminals attaining the select group are bridged through the switch 12 (FIG. 1) to the group synchronizer 20. Periodically, after a brief delay as indicated by the block 78, the group might be collectively advised, e.g. "Again, welcome to the live communication by President Smith; the select group is being composed and President Smith will be on the line in approximately thirty seconds."

As indicated in FIG. 3, after the short delay of the block 78, the system tests for the time of live communication as indicated by the query block 80. If the clock in the unit 14 (FIG. 1) indicates the time for live communication is remote, the group status message again is provided as indicated by a block. Alternatively, if the time is near, the process moves to the control of command signal I3 and live communication is initiated as shown by block 84. Of course, in an alternative program, the period of live communication may be initiated from the primary terminal PT.

At the instant when the clock within the unit 14 determines the time has occurred for a "live" interconnect, the switch 12 bridges the group of callers to the primary telephone terminal PT. Accordingly, the select group of callers at certain of the telephone terminals T1 through TN is connected for unilateral communication from the assumed personage at the primary telephone terminal PT until the process is completed as indicated by a block 86 prompting termination.

As indicated above, once the live interface has begun, select bilateral conversations can be accommodated. In that regard, the primary telephone terminal PT (FIG. 1) can be actuated causing the unit 14 to open an inbound voice passage through the line 80 and the coupling 22 to the primary telephone terminal PT. Accordingly, the personage at the telephone terminal PT may interface select callers in a bilateral voice conference. Such a communication may be stimulating, interesting and/or informational to listeners of the select group. As indicated above, such operations occur during the interval of the command signal I4.

Also as indicated above, the select group may be polled for data which is provided in digital form from the telephone terminal push buttons. In that regard, the multiplexer switch 12 is actuated during the interval of command signal I5 (initiated from the terminal PT) to accommodate the passage of digital data into the buffer 24 for accumulation. Accordingly, digital signals formulated at individual terminals T1-TN are accumulated in the buffer memory 24 for subsequent processing in the unit 14. Consider a specific example.

A basis for polling a select group at terminals T1-TN was mentioned above with regard to a shortened work schedule. To pursue that example, after prompting the multitude of subjects at terminals T1-TN, individual lines L1-LN are coupled by the switch 12 to pass digital signals to the memory 24 activated by the command signal I5. In the example, votes were designated either by "1" or "2". Thus, the digital values are accumulated in the memory 24 to indicate poll results and may be displayed at the primary terminal PT, along with other data including specific responses.

Note that the actual polling period or time window is defined by the command signal I5. The signal may be terminated by the control unit 14, or control may be referred to the primary terminal PT. Control of the polling period by the primary terminal PT allows observation of polling results for guidance in ending the period.

It will be appreciated that various polls can be taken effectively by systems of the present invention. One such alternative might involve random digit dialing. Specifically, bounds for legitimate telephone numbers are defined in the unit 14 in accordance with a poll objective. For example, it may be desired to randomly poll persons in the areas designated by area codes 213, 818, 714 and 619. Accordingly, a random number generator as well known in the art could select area codes and terminal numbers at random. Such terminals could then be called for polling.

Similarly, specific digits of telephone terminal numbers could be specified conforming to number assignments; however, again retaining possibilities to accommodate a random selection. In a more defined context, a random-number generator implemented in the unit 14 may address a look-up table also implemented in the unit 14. Accordingly, random selection is afforded to accomplish a defined multitude of individual numbers. When a specific number of calls are connected, the process could proceed. Statistically, such an implementation offers interesting possibilities with regard to polling techniques.

Figure 4:
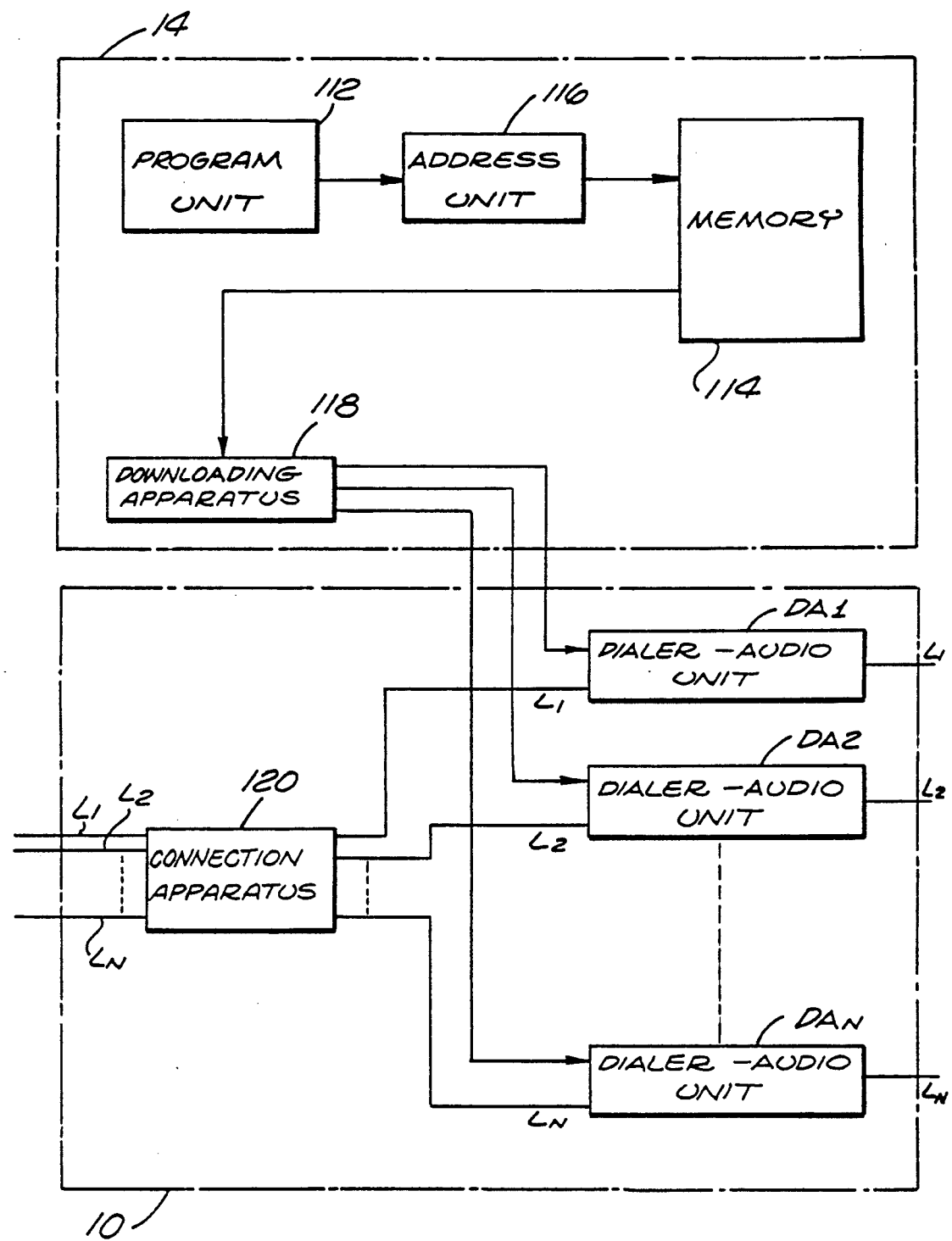
FIG. 4 is a block diagram of another component portion of the system of FIG. 1.

Another implementation of the system may involve a number of programs which are called up for operation at specific time intervals to perform an interface. Structure involved for such implementation is illustrated in FIG. 4 showing the connection equipment 10 and the control unit 14 in somewhat greater detail.

With the unit 14, a program unit 102 is actuated to specify addresses for specific subjects prior to an interface operation. In that regard, subjects within the memory 114 may be addressed by a specific time through an address unit 116. Responsive to such a time, the memory 114 provides identification for subjects through a downloading apparatus 118 to the connection equipment 10. Specifically, the downloading apparatus 118 supplies terminal calling numbers and cuing data to dialer-audio units DA1 through DAN. Once loaded, the dialer-audio units DA1 through DAN operate in cooperation with lines L1 through LN as described above to establish specific connections with individual persons.

To consider a specific operation, assume an interface is to be executed in conjunction with a television program. Accordingly, at a specific time, the program unit 112 actuates the address unit 116 to download a select group of participants from the memory 114 through the downloading apparatus 118 to the dialer-audio units DA1 through DAN. Of course, the operation may involve several cycles of downloading to attain the desired select group coupled through the connection apparatus 120 and the lines L1-LN. The operation would involve the phases as explained above to accomplish variously the select group for the desired interface. Thus, individuals would be cued, connected, communicated with and could also be accommodated return communication.

From the above descriptions it may be seen that the system of the present invention affords an enhanced communication capability for use in conjunction with a substantial number of remote terminals. Of course, various other techniques and specific structures may be employed in implementing the system. Accordingly, the scope hereof is deemed appropriately determined in accordance with the claims as set forth below.

What is claimed is:

1. A multiple-party control system for use with a telephone facility to interface a coupled primary terminal with a multiplicity of remote coupled terminals through said telephone facility, said system comprising:
   a audio generator structure for providing audio signals to cue persons at said remote terminals;
   switching apparatus for bridging a multitude of said remote terminals under control of signals from said remote terminals;
   coupling apparatus connected to said switching apparatus unilaterally connecting said multitude of remote terminals to said primary terminal for receiving audio communication; and
   control structure including a memory for storing qualification reference data for interfacing said persons, said system further including means for testing said reference data against signals from said remote terminals.

2. A control system according to claim 1 wherein said control structure further includes means for selectively enabling said remote terminals to communicate through said switching apparatus to said primary terminal.

3. A control system according to claim 2 wherein said control structure enables audio communication from certain of said remote terminals.

4. A control system according to claim 2 wherein said control structure enables digital communication from said remote terminals.

5. A multiple-party control system for use with a telephone facility to interface a primary terminal with a multiplicity of remote terminals through said telephone facility, said system comprising:
   preliminary structure for calls at connected terminals to provide audio information to persons at connected terminals;
   gang holding structure for collectively communicating with persons at said connected terminals collectively as a group; and
   controlled switch means for initially coupling individual terminals to said preliminary structure during an engagement phase of operation, subsequently connecting said terminals to said gang holding structure during a pending phase of operation and thereafter connecting said gang holding structure to said primary terminal for collectively receiving unilateral audio communication.

6. A system according to claim 5 wherein said gang holding structure enables live and simultaneous communication.

7. A multiple-party control system for use with a telephone facility to interface a primary terminal with a multiplicity of remote terminals for controlled communication through said telephone facility, said system comprising:
   preliminary structure for calls at connected of said remote terminals;
   gang holding structure for collectively communicating via audio to persons at said connected terminals as a group and receiving digital signals therefrom; and
   controlled switch means for coupling connected terminals to said preliminary structure during an engagement phase of operation, said controlled switch means further for coupling said connected terminals to said gang holding structure after said engagement phase and thereafter coupling said connected terminals for controlled selective communications.

8. A multiple-party control system according to claim 7, wherein said controlled switch means includes a memory for storing qualification reference data for interfacing said persons, said system further including means for testing said reference data against signals from said remote terminals.

9. A multiple-party control system according to claim 7, wherein said reference data consists of caller telephone number data.

10. A multiple-party control system according to claim 9, wherein said telephone number data is provided automatically from the communication facility in the form of ANI signals.

11. A multiple-party control system for use with a telephone facility to interface a primary terminal with a multiplicity of remote terminals for controlled communication through said telephone facility, said system comprising:
- a control computer means for defining signal-indicated operating sequences including, an engagement phase and a group communication phase;
- engagement means for providing information via audio and controlled by said control computer means to inform said remote terminals individually during said engagement phase then couple a group of remote terminals for collective operation;
- audio communication means controlled by said control computer means for interfacing said group of remote terminals unilaterally with audio communication during one part of said group communication phase; and
- data receiving means controlled by said control computer for receiving digital data from said remote terminals during another part of said group communication phase.

12. A process for interfacing a primary telephone terminal with a plurality of remote telephone terminals through a telephone facility, comprising the steps of:
- confirming calls at said remote telephone terminals, and providing audio signals to individually inform callers at said remote telephone terminals;
- after confirming calls and individually informing callers, bridging said calls from said remote terminals for gang holding;
- communicating unilaterally and collectively via audio with said gang holding remote terminals from said primary terminal; and
- digitally communicating with said primary terminal from said gang holding remote terminals.

13. A multiple-party control system for use with a telephone facility to selectively interface a primary terminal with a multiplicity of remote terminals through said telephone facility, said system comprising:
- a audio generator structure, initially for providing audio signals to cue persons at said remote terminals through said telephone facility;
- switching apparatus for collectively bridging a multitude of said remote terminals through said telephone facility;
- coupling apparatus connected to said switching apparatus, unilaterally connecting said multitude of bridged remote terminals collectively to receive audio communication; and
- control structure for selectively enabling said remote terminals to communicate digitally through said switching apparatus to said primary terminal.

14. A multiple-party control system for use with a telephone facility to interface a primary terminal with a multiplicity of remote terminals through said telephone facility, said system comprising:
- preliminary structure to provide audio information to callers at connected terminals;
- a memory for down-loading terminal numbers;
- automatic dialing means for selectively connecting with said terminals;
- switch means for actuating said automatic dialing means to receive down-loaded terminal numbers to establish terminal connections, initially coupling individual connected terminals to said preliminary structure during an engagement phase of operation, and thereafter connecting said gang holding structure to said primary terminal for collectively receiving unilateral audio communication; and
- control structure including a memory for storing qualification reference data for interface subjects and said system further including means for testing said reference data against signals from said remote terminals.

15. A control system according to claim 14 further including means to receive data from at least one of said individual terminals connected for controlled communication.

16. A control system according to claim 15 wherein said means to receive data comprises a digital means for receiving digital data provided from said individual terminals.

17. A control system according to claim 15 wherein said means to receive data receives audio signals.

18. A control system according to claim 15 further including comparator means for testing said data from said individual terminals.

* * * * *

UNITED STATES PATENT AND TRADEMARK OFFICE
CERTIFICATE OF CORRECTION

PATENT NO.    : 5,297,197                                       Page 1 of 1
DATED         : March 22, 1994
INVENTOR(S)   : Ronald A. Katz It is certified that error appears in the above-identified patent and that said Letters Patent is hereby corrected as shown below:

<u>Title page,</u>
Item [*], Notice, please replace "The portion of the term of this patent subsequent to Jul. 3, 2007 has been disclaimed." with the following:

-- The portion of the term of this patent subsequent to Jun. 26, 2009 has been disclaimed. --

Signed and Sealed this

Twenty-ninth Day of April, 2003

JAMES E. ROGAN
*Director of the United States Patent and Trademark Office*